United States Patent [19]

Baker

[11] Patent Number: 4,790,057

[45] Date of Patent: Dec. 13, 1988

[54] PIPE MANIPULATOR

[76] Inventor: James B. Baker, 25 Lachlan St., Cowra, NSW, Australia, 2794

[21] Appl. No.: 13,854

[22] Filed: Feb. 12, 1987

[51] Int. Cl.⁴ .............................................. B23P 19/04
[52] U.S. Cl. ......................................................... 29/237
[58] Field of Search .................. 29/237, 252, 282, 280; 254/29 R; 269/43

[56] References Cited

U.S. PATENT DOCUMENTS

| | | | |
|---|---|---|---|
| 2,958,125 | 11/1960 | Nichols | 29/237 |
| 3,653,115 | 4/1972 | Perkins | 29/237 |
| 3,668,766 | 6/1972 | Carter et al. | 29/237 |
| 4,178,668 | 12/1979 | George | 29/237 |

FOREIGN PATENT DOCUMENTS 2433946  2/1976  Fed. Rep. of Germany ........ 29/237
621844   8/1978  U.S.S.R. ............................... 29/237

Primary Examiner—Robert C. Watson
Attorney, Agent, or Firm—Townsend and Townsend

[57] ABSTRACT

A pipe manipulator for dismantling a pipeline includes a frame, a slide, a plurality of jaws for gripping the pipe to be dismantled, disengaging means, means for connecting the slide to the jaws and telescoping means. The telescoping means is connected to the disengaging means and the slide. Movement of the telescoping means causes movement of the slide and the disengaging means. The slide and jaws are mounted to the frame such that the slide moves in a longitudinal direction, opening and closing the jaws. The pipe can be uncoupled, dismantled and relocated without excessive damage to the pipes such that the operation is economically feasible.

9 Claims, 1 Drawing Sheet

U.S. Patent
Dec. 13, 1988
4,790,057
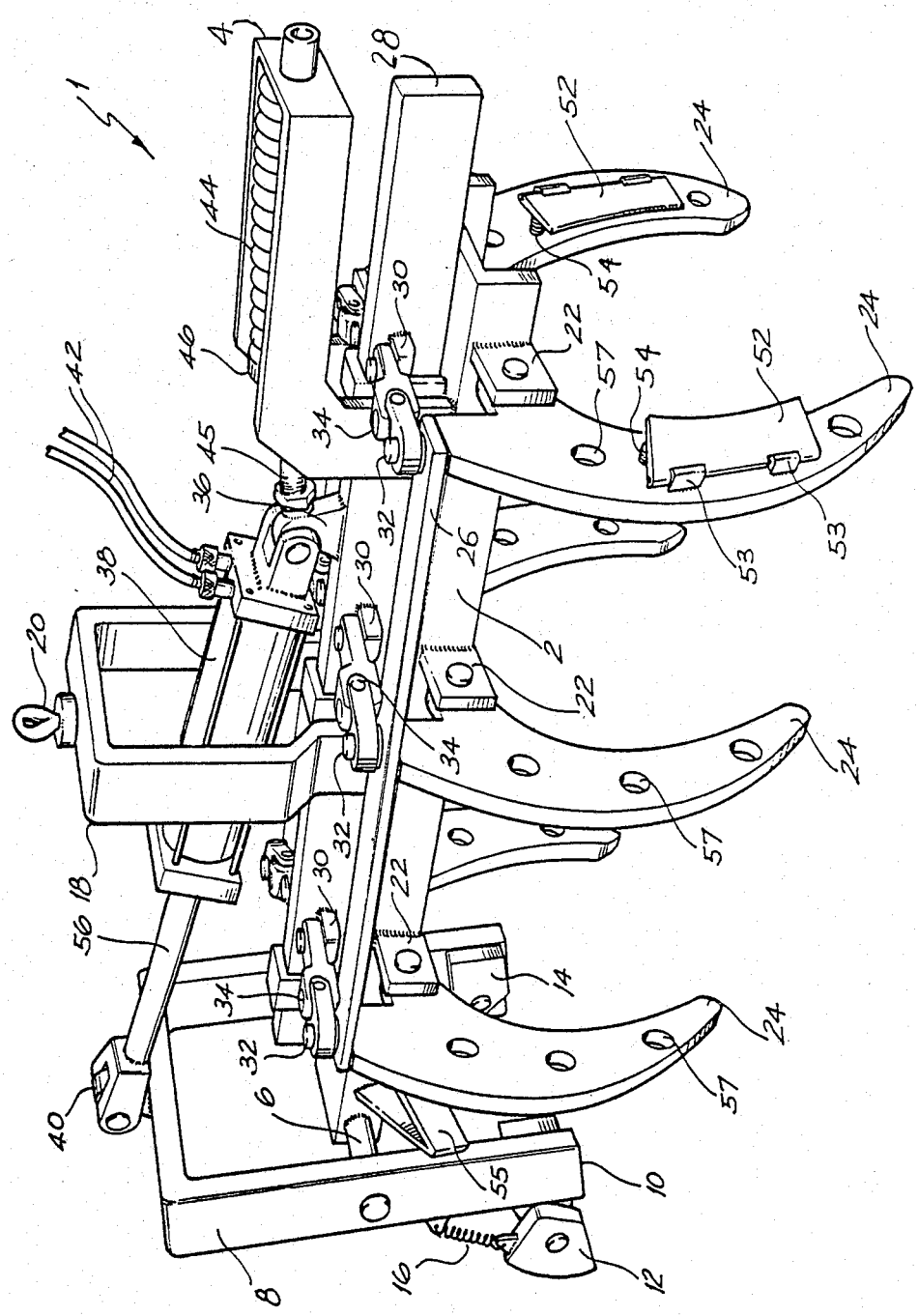

PIPE MANIPULATOR

This invention concerns a pipe manipulator for water drainage pipes, sewage pipes and the like. The device is especially suited for manipulating such pipes when the latter are laying in a trench, or accessible by means of a mechanical lifting and powering device e.g. crane, hoist, tractor or compressor etc.

Irrigated farmland is extensively reticulated with water supply pipes. So too domestic water and sewage under council retculation schemes. These are commonly approximately 4 meters long, made of asbestos cement (but can be of other properties e.g. fibreglass U.P.V.C. and steel to mention a few) and incrementally sized in inches from 2 inches to 24 inches or more. The wall thickness of the pipes do not increase in direct proportion and consequently any device must take account of the changes in external diameter and must be self-adjusting.

The pipes are commonly manufactured with plain spigoted ends and joined with a coupling which coaxially overlaps a pair of adjacent spigoted pipe ends and nips a sealing ring between the sleeve and the pipe or bell and spigot. An equivalent system utilises pipes with a socket at one end and a spigot at the opposite end. These too are sealed with a lip seal or O-ring or V-ring. When installed as a pipeline in a trench or elsewhere the pipes represent a substantial capital outlay to the farmer or users. If the water requirements change and pipelines become redundant there is no ready means of recovering and reusing the pipes as the seals become difficult to shift and the pipes can become fragile if attempted reclamation is pursued and therefore can become economical. Many pipelines are therefore abandoned well before their useful life is over.

This invention seeks to provide an apparatus capable of dismantling a pipeline of the type referred to above at a sufficient rate and with a breakage score which renders dismantling and relocation an economically feasible operation.

According to one aspect of the present invention there is disclosed a pipe manipulator for detaching a pipe from a coupling or vice versa which connects two adjacent pipes or from the complementary end of another pipe comprising a pipe gripper for the pipe to be uncoupled, an engager for the coupling or complementary pipe and powered means for separating the gripper together with the gripped pipe in an uncoupling direction, from the engager.

The engager can be a like gripper capable of gripping the coupling or complementary pipe but preferably the engager is a yoke which straddles the pipe to be uncoupled and abuts an annular end face of same.

The gripper can be a pair of jaws which are biassed for example by a spring to initially grip the pipe to be uncoupled sufficiently for the powered separator to exert separating pressure. Alternatively the jaws can be opened and closed by a pneumatic or hydraulic ram. The fluid powered means for separating the gripper and engager can also be a ram. The manipulator can have a spring to which the jaws are hinged in an underslung position and upon which the yoke is pivoted, the ram being connected at one end to the yoke and at the opposite end to a linkage for operating the jaws.

According to another aspect of the present invention there is disclosed a method of disconnecting a pair of pipes comprising gripping one pipe in a pipe manipulator as described above and engaging the end of the remaining pipe as a reaction surface and inserting a separate force on the pipes.

One embodiment of the invention is now described with reference to the single FIGURE of the accompanying drawing.

A manipulator device 1, comprises a spine 2 of channel section which is fabricated from welded steel bar. One end of the spine 2 is cranked upwardly and formed into a spring pocket 4. The opposite end is bored to receive a transverse shaft 6 which provides a pivot axis for an inverted U-shaped yoke 8. Free ends 10 of the yoke 8 each carry a pad 12 which is pivotally mounted on a forward extension 14 of the yoke 8. A spring 16 extending between the pad 12 and the free end 10 biasses the pad 12 to squarely engage the end wall of a sleeve (not shown) which joins two pipes.

The pad 12 and spring 16 can be replaced by bearing mounted wheels which allow and assist rotation of the free end 10 relative to the end wall of a sleeve (not shown) which joins two pipes. The rotation of the yoke 8 can induce rotation of the free end and translation of the free end and the bearing mounted sheel assist the translation of the free end across the surface of the end wall.

A portion of the yoke 8 intermediate the free ends 10 and the shaft 6, abuts a buffer 55 which prevents any further rotation of the yoke 8.

A shackle 18 is connected to the centre of gravity of the device 1 and an eye 20, pivoted on the shackle 18, enables the device 1 to be lifted and positioned by a jib crane mounted at the rear of a tractor (not shown) or some other crane, jib or positioning device.

The spine 2 embodies three pairs of transverse brackets 22, of which the left hand set only are seen in the drawing. Each bracket 22 mounts a pipe-gripping jaw 24. The set of three jaws are ganged by a tie bar 26. The corresponding set on the opposite side of the spine are ganged by a corresponding tie bar (not shown). The purposes of the jaws 24 is to straddle the pipe to be separated from the pipeline due for dismantling and to grip and release the pipe under the influence of the mechanism next described.

The pipe gripping jaws 24 have holes 57 therethrough in order to adapt different sized jaw plates which are bolted through these holes through the existing jaws 24. Different sized pipes require different curvature on the gripping jaw 24.

On the last two jaws, that is on the end opposite to the yoke 8, there is a spring loaded locking jaw 52 which is hingedly attached to the jaws 24. (only the far jaw 24 is illustrated in this figure as having a spring loaded locking jaw.) The locking jaw 52 is hinged to the jaw 24 by hinges 53 and is biased by means of spring 54. The purpose of the spring loaded locking jaw is to provide a stronger grip on the pipe being disconnected as the jaws 24 are moving in a direction to the right hand side of the page. As the locking jaws 24 are moving in this direction the locking jaws 52 provide a stronger grip on the pipe to prevent same slipping relative to the jaws 24. This ensures a more positive traction for the device 1 in its removal of the pipe.

The spine 2 also supports a slide 28 which has three pairs of lugs 30 each connected to a corresponding post 32 fixed to the top of an associated jaw 24 by a link 34. The connection of the link 34 to the post 32 incorporates a universal joint (not illustrated) such that reciprocating movement of the slide 28 produces opening and closing of the jaws 34. The universal joint can be replaced by a ball joint which can bear greater loads.

The slide has a trunion block 36 welded to it. A pneumatic or hydraulic cylinder 38 is connected between the trunion block 36 and a like block 40 on the bridge of the yoke 8. The pneumatic cylinder 38 is hydraulically or pneumatically powered by hoses 42 also supported by the crane jib (not illustrated).

The slide 28 is biased to an equilibrium position by a compression spring 44 trapped between the end of a spring pad 46 (which is connected by a tie rod 45 to the trunion block 36) and the spring pocket end wall 4. The equilibrium position corresponds to first pressure joint of the jaws 24 on the pipe.

The device 1 works as follows. The pneumatic cylinder 38 is pressurized in one direction to extend the rod 56 of ram 28. This then brings the yoke 8 into abutment with the buffer 55. Because the yoke 8 cannot rotate, any further pressurisation of cylinder 38 causes the pneumatic cylinder 38, trunnion 36 and consequently the slide 28 to move backwards, compressing the spring 44. This movement opens the jaws 24 to clear the pipe. The jib then lowers the device 1 onto the pipe or into the trench containing the excavated pipeline such that the pads 12 are close to the first pipe sleeve and level with its diametric centre. As soon as the pressure on the pneumatic cylinder 38 is released spring 44 closes the jaws 24 about the pipe up to the point of first pressure or contact which is just enough to cause the jaws 24 to grab when the pneumatic cylinder 38 is reversed. Reversal locks the jaws 24 onto the pipe to be detached or onto the plate from which the connector is to be removed and yoke 8 pivots about transverse shaft 6. The pads 12 act against the coupling which in turn causes the spring loaded jaws 52 to exert a more positive pressure on the pipe and move the whole device and the gripped pipe in a disengaging direction or alternatively remain on the fixed pipe and dislodge the connector. Thus the disengagement continues until the pipe detaches completely whereupon the crane lifts the pipe out of the trench whereupon it is released and rolled onto a forklift or whatever.

The device is adaptable for different pipe diameters by fitting distance pieces to the jaws and auxiliary pads inside the existing pads or auxiliary bearing mounted wheels. In a modified version a pneumatic or hydraulic facility is provided for imposing repeated pulses on the jaw so as to jar the pipes apart as with a series of impacts.

The claims:

I claim:

1. A pipe manipulator for detaching a first pipe from one of a coupling and a second pipe, the coupling and the second pipe being connected together at a joint, the pipe manipulator being placed on said first pipe adjacent said joint, the pipe manipulator comprising:
   a longitudinal frame;
   a slide constrained by said frame to move in a longitudinal direction;
   a pipe gripper attached to said frame and adapted to grip said first pipe;
   said gripper being movable between an open and a closed position;
   a disengager adapted to engage said one of said coupling and said second pipe and being movable with respect to said frame;
   a connector connecting said slide to said gripper, whereby movement of said slide opens and closes said gripper;
   elongated telescoping means connected at one end thereof to said disengager and at the other end thereof to said slide, whereby said telescoping means moves between first, second and third positions, causing movement of at least one of said slide and said disengager;
   a first stop for limiting said movement of said disengager;
   biasing means for biasing said slide to said first position such that said telescoping means has a first length, said disengager being adjacent to said first stop, said gripper being in a closed position, and wherein the length of said telescoping means is changed from said first length to a second length such that said disengager is urged against said stop and said slide is urged against said biasing means to a second position, thereby opening said gripper such that said manipulator is adapted to be placed on said first pipe; and
   a third length intermediate said first and second lengths such that said slide is in said third position when said gripper initially grips said first pipe, and said disengager engaging said one of said second pipe and said coupling as said telescoping means moves from said third position toward said first position, thereby separating said first pipe from said one of said second pipe and said coupling, said slide being simultaneously urged to move in a direction increasing the grip of said pipe gripper on said first pipe.

2. The pipe manipulator of claim 1 wherein the pipe gripper comprises at least one pair of opposed jaws.

3. The pipe manipulator of claim 2 wherein said jaws are adapted to receive auxiliary jaws to engage smaller diameter pipes.

4. The pipe manipulator of claim 2 wherein said jaws further comprise spring loaded locking jaws wherein slippage of said manipulator away from said one of said second pipe and said coupling causes said locking jaws to increase their grip on said first pipe.

5. The pipe manipulator of claim 1 wherein the disengager comprises a yoke rotatable about a transverse axis.

6. The pipe manipulator of claim 5 wherein said yoke is adapted to receive auxiliary pads to engage smaller diameter pipes.

7. The pipe manipulator according to claim 1 wherein said first and third lengths are the same.

8. The pipe manipulator of claim 1 wherein the telescoping means is a hydraulic ram.

9. A pipe manipulator for detaching a first pipe from one of a coupling and a second pipe connected together at a joint, the pipe manipulator being placed on said first pipe adjacent said joint and comprising:
   a longitudinal frame;
   a plurality of pipe gripping jaws attached to said frame and adapted to grip said first pipe;
   said jaws being simultaneously movable between an open and a closed position;
   a disengager, including a slide, constrained by said frame to move in a longitudinal direction, and a connector, connecting said slide to said jaws, whereby movement of said slide opens and closes said jaws, the disengager adapted to engage said one of said coupling and said second pipe and being movable with respect to said frame so as to simultaneously move the jaws between open and closed positions.

* * * * *